United States Patent
Ghabra et al.

(10) Patent No.: US 8,531,268 B2
(45) Date of Patent: Sep. 10, 2013

(54) PASSIVE ENTRY SYSTEM FOR AN AUTOMOTIVE VEHICLE

(75) Inventors: Riad Ghabra, Dearborn Heights, MI (US); Ehab Abdulla Tarmoom, Allen Park, MI (US)

(73) Assignee: Lear Corporation, Southfield, MI (US)

( * ) Notice: Subject to any disclaimer, the term of this patent is extended or adjusted under 35 U.S.C. 154(b) by 1268 days.

(21) Appl. No.: 12/120,967

(22) Filed: May 15, 2008

(65) Prior Publication Data

US 2009/0284345 A1 Nov. 19, 2009

(51) Int. Cl.
| | |
|---|---|
| *G05B 19/00* | (2006.01) |
| *G05B 11/01* | (2006.01) |
| *G08B 13/14* | (2006.01) |
| *G05D 1/00* | (2006.01) |
| *B60R 25/00* | (2013.01) |
| *B60R 25/10* | (2013.01) |
| *H04B 1/02* | (2006.01) |
| *H04M 1/00* | (2006.01) |
| *H04Q 5/22* | (2006.01) |
| *E05B 45/06* | (2006.01) |

(52) U.S. Cl.
USPC ..... 340/5.61; 340/5.31; 340/5.72; 340/572.9; 340/10.33; 340/10.52; 340/12.22; 340/542; 340/426.13; 455/92; 455/569.2; 701/1

(58) Field of Classification Search
USPC ............... 340/10.1, 10.33, 5.72, 10.34, 10.4, 340/425.5, 426.1, 426.35, 426.36, 539, 825.69, 340/825.72, 825.3; 455/52.3, 69, 70, 78, 455/92, 99, 134, 152.1, 161.3, 226.2, 227, 455/456.1, 456.2, 456.3, 456.4, 522; 701/1, 701/36, 49
See application file for complete search history.

(56) References Cited

U.S. PATENT DOCUMENTS

| | | | |
|---|---|---|---|
| 4,688,036 A | 8/1987 | Hirano et al. | |
| 4,942,393 A | 7/1990 | Waraksa et al. | |
| 5,319,364 A | 6/1994 | Waraksa et al. | |
| 5,319,633 A * | 6/1994 | Geyer et al. | 370/254 |
| 5,515,036 A | 5/1996 | Waraksa et al. | |
| 5,969,597 A * | 10/1999 | Weigl et al. | 340/5.61 |
| 6,188,326 B1 * | 2/2001 | Flick | 340/12.28 |
| 6,236,333 B1 | 5/2001 | King | |
| 6,240,347 B1 * | 5/2001 | Everhart et al. | 701/36 |
| 6,437,683 B1 * | 8/2002 | Wolf et al. | 340/5.61 |
| 6,480,117 B1 * | 11/2002 | Flick | 340/12.28 |
| 6,768,447 B2 * | 7/2004 | Franckart | 342/357.31 |
| 7,224,980 B2 * | 5/2007 | Hara | 455/456.1 |
| 7,286,042 B2 * | 10/2007 | Perraud et al. | 340/10.33 |
| 2004/0183714 A1 * | 9/2004 | Yamashita et al. | 342/70 |
| 2006/0114100 A1 | 6/2006 | Ghabra et al. | |
| 2006/0267407 A1 * | 11/2006 | Nagaoka et al. | 307/10.1 |
| 2006/0279401 A1 * | 12/2006 | Yoshii et al. | 340/5.61 |

(Continued)

FOREIGN PATENT DOCUMENTS

| | | |
|---|---|---|
| EP | 0598107 | 5/1994 |
| JP | 10306639 | 11/1998 |

*Primary Examiner* — Jennifer Mehmood
*Assistant Examiner* — Mirza Alam
(74) *Attorney, Agent, or Firm* — Brooks Kushman P.C.

(57) ABSTRACT

A passive entry system for an automotive vehicle may include a token capable of receiving a plurality of wireless signals. The token may generate a response signal to at least one of the plurality of wireless signals and reconfigure so that the token does not provide a response to at least one of the plurality of wireless signals.

20 Claims, 2 Drawing Sheets

(56) References Cited

U.S. PATENT DOCUMENTS

2007/0139164 A1* 6/2007 O'Toole et al. ............ 340/10.2
2007/0188301 A1* 8/2007 Nakajima et al. ............ 340/5.61
2008/0091605 A1* 4/2008 Hughes et al. ............... 705/51

* cited by examiner

PASSIVE ENTRY SYSTEM FOR AN AUTOMOTIVE VEHICLE

SUMMARY

A passive entry system for an automotive vehicle having a cabin includes a control unit configured to broadcast a plurality of wake-up signals to prompt a token to power-up if the token is in a low-power consumption mode. The system also includes a token capable of recognizing at least one of the plurality of wake-up signals and of generating a response signal for the control unit in response to recognizing the at least one of the plurality of wake-up signals. The control unit is further configured to determine if the token is located in the cabin based on the response signal and to broadcast a reconfiguration signal to prompt the token to reconfigure so that the token does not recognize wake-up signals broadcast subsequent to the reconfiguration signal if the token is located in the cabin.

A passive entry system for an automotive vehicle having a cabin includes a control unit configured to broadcast a plurality of signals and a token capable of generating a response signal for the control unit based on one of the plurality of signals. The control unit is further configured to determine if the token is located in the cabin based on the response signal and to broadcast a reconfiguration signal to prompt the token to reconfigure so that the token does not generate the response signal to at least some signals broadcast by the control unit subsequent to the reconfiguration signal.

A passive entry system for an automotive vehicle includes a token capable of receiving a plurality of wireless signals. The token is configured to determine if a predetermined number of wireless signals has been received, to generate a response signal to at least one of the plurality of wireless signals if the number of received wireless signals is less than the predetermined number of wireless signals, and to reconfigure so that the token does not provide a response to at least one of the plurality of wireless signals if the number of received wireless signals is greater than the predetermined number of wireless signals.

While example embodiments in accordance with the invention are illustrated and disclosed, such disclosure should not be construed to limit the claims. It is anticipated that various modifications and alternative designs may be made without departing from the scope of the invention.

DETAILED DESCRIPTION

Passive start and entry (PASE) systems may unlock and start a vehicle without a key. Certain PASE systems communicate an inquiry signal to a token, such as a fob or card, carried by a user. The token, in response, transmits a confirmation signal. Doors of the vehicle may be unlocked and the vehicle may be started when the signal is confirmed. If the token becomes a predetermined distance away from the vehicle, the doors may be locked.

Figure 1:
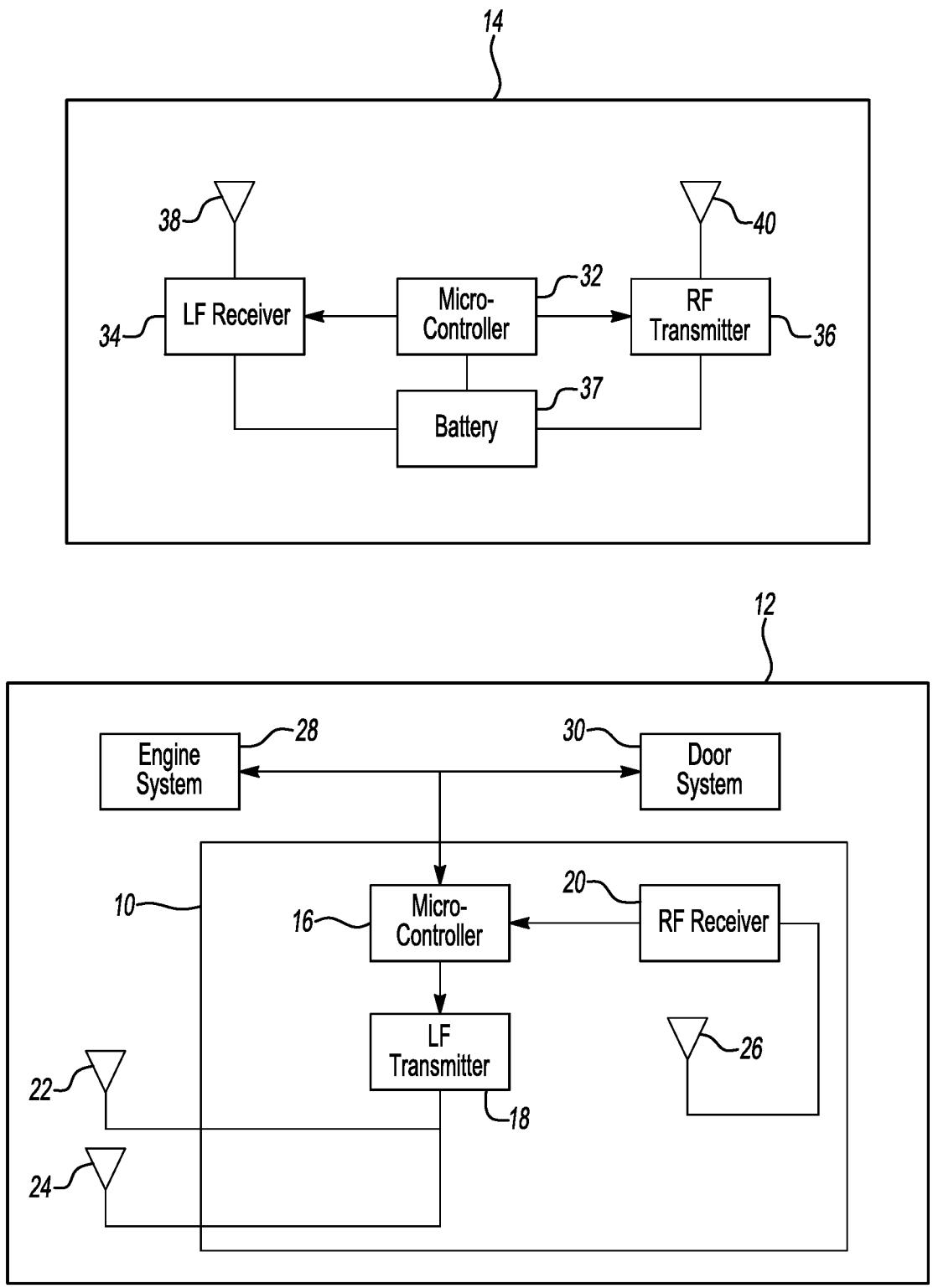
FIG. 1 is a block diagram of an embodiment of a passive entry system.

Referring now to FIG. 1, an embodiment of a PASE module 10 of an automotive vehicle 12 may be configured to communicate with a token 14, e.g., fob, card, etc. The PASE module 10 includes a micro-controller 16 electrically coupled with a low frequency transmitter 18 and a high frequency receiver 20, e.g., a radio frequency receiver. Other configurations and arrangements are, of course, also possible. For example, the micro-controller 16 may be electrically coupled with a high frequency transmitter (not shown) and/or a low frequency receiver (not shown).

As used herein the phrase "low frequency" typically refers to frequencies in the range of 3-300 KHz. The phrase "high frequency" typically refers to frequencies in the range of 300 MHZ-3 GHz. Other ranges, however, are also possible.

In the embodiment illustrated in FIG. 1, antennas 22, 24 are electrically coupled with the low frequency transmitter 18. An antenna 26 is coupled with the radio frequency receiver 20. The position of the antennas 22, 24 within the vehicle 12 is known by the micro-controller 16. As discussed below, this position information may be used by the micro-controller 16 to determine the location of the fob 14 relative to the antennas 22, 24. For example, the antennas 22, 24 may respectively be positioned near a driver's side door and passenger's side door (not shown) of the vehicle 12. If each of the antennas 22, 24 detects the presence of the fob 14, the fob 14 is likely in the cabin of the vehicle 12, i.e., the fob 14 is between the driver's side door and passenger's side door. In other embodiments, additional antennas (as well as additional receivers and/or transmitters) may be positioned throughout the vehicle to, inter alia, monitor additional regions of the vehicle 12, such as a trunk.

The micro-controller 16 of FIG. 1 may be coupled with an engine system 28 and a door system 30. The micro-controller 16 may control/monitor the operation of the systems 28, 30. For example, the micro-controller 16 may lock and unlock the door system 30 in response to receiving suitable remote keyless entry commands. In other embodiments, the micro-controller 16 may be coupled with any suitable vehicle system to be controlled/monitored by the PASE module 10. For example, the micro-controller 16 may be electrically coupled with a lighting system or climate control system.

In the embodiment of FIG. 1, the fob 14 includes a micro-controller 32 electrically coupled with a low frequency receiver 34 and a high frequency transmitter 36, e.g., a radio frequency transmitter. In other embodiments, the micro-controller 32 may be electrically coupled with a high frequency receiver and/or a low frequency transmitter. Other configurations and arrangements are also possible. An energy storage unit 37, e.g., a 3V 240 mA·hr battery, capacitor, etc., supplies power to the micro-controller 32, low frequency receiver 34 and high frequency transmitter 36. The low frequency receiver 34 may continuously draw power, e.g., 5 µA, from the battery 37 while activated.

An antenna 38 is electrically coupled with the low frequency receiver 34. An antenna 40 is electrically coupled with the radio frequency transmitter 36. In other embodiments, the fob 14 may include buttons and/or a display (not shown) associated with remote keyless entry functions such as door locking/unlocking and panic alarm as well as others.

In the embodiment of FIG. 1, the low frequency receiver 34 of the fob 14 receives wake-up signals broadcast via the low frequency transmitter 18 of the PASE module 10. The wake-up signals prompt the micro-controller 34 to power-up from a low-power consumption mode in anticipation of further communications and in advance of executing further code.

An example passive entry sequence may begin when a door handle switch (not shown) of the door system 30 generates a triggering pulse. This triggering pulse is provided to the micro-controller 16. In response to the triggering pulse, the micro-controller 16 generates a trigger generation function. The low frequency transmitter 18 is activated to generate the low frequency wake-up signals, discussed above, associated with the trigger generation function. The low frequency wake-up signals are broadcast via the antennas 22, 24. The low frequency wake-up signals respectively broadcast by the antennas 22, 24 may include information indicative of the antenna from which it was broadcast.

As discussed above, the low frequency wake-up signals may facilitate locating the fob 14 relative to the antennas 22, 24. In some embodiments, the low frequency receiver 34 includes suitable circuitry (not shown) for measuring a received signal strength indicator (RSSI) of each of the low frequency wake-up signals. The micro-controller 32 includes the RSSI information in a response sent to the PASE module 10. The PASE module 10 determines which antenna is nearest the fob 14 based on the RSSI information. Locating the fob 14 relative to the antennas 22, 24 may ensure that a user of the fob 14 is located in the area where the passive function is being requested. For example, locating the fob 14 relative to the antennas 22, 24 may ensure that the user of the fob 14 is located outside the door system 30 when the door handle switch (not shown) is actuated. Likewise, locating the fob 14 relative to the antennas 22, 24 may reveal that the fob 14 is located within the cabin of the vehicle 12. As discussed in detail below, various techniques may be employed to conserve the life of the battery 37 when the micro-controller 16 determines that the fob 14 is located within the cabin of the vehicle 12.

In certain embodiments, the micro-controller 16 generates a random number to be used as a seed number in a mathematical transformation that is also known by the micro-controller 32 as part of any suitable challenge/response validation sequence. A challenge signal that includes information indicative of the random number may be broadcast from the PASE module 10. The fob 14 receives the challenge signal. The micro-controller 32 applies the mathematical transformation to the random number. The transformed random number, as well as the RSSI information discussed above and a fob identifier, are included in a response sent to the PASE module 10. The micro-controller 16 may then check the fob identifier and the transformed random number to validate the fob 14.

The PASE module 10, as discussed above, may permit, for example, a user to unlock and/or start the vehicle 12. In some embodiments, a touch sensor or button on a door (not shown) triggers the PASE module 10 to begin the interrogation process described above. In other embodiments, a user of the fob 14 need not press/touch the fob 14 to, for example, unlock and/or start the vehicle 12. Rather, the user simply needs to approach the vehicle 14. In such embodiments, the PASE module 10 may periodically transmit, as discussed above, a wireless signal, e.g., a polling signal, to check if any fobs are within a vicinity of the vehicle 12. An example message rate may be approximately once a second in order to trigger a fob of a user that is approaching the vehicle 12. Any fob within the communication range may respond, as discussed above, to the polling signal. Thereafter, the PASE module 10 may initiate and complete the interrogation process described above before the user, for example, pulls a door handle (not shown).

If the fob 14 is left, for example, in the cabin of the vehicle 12, it may frequently wake-up and respond to the polling signals described above. Such responses broadcast via the high frequency transmitter 36 may unnecessarily consume power from the battery 37. In some embodiments described herein, the low frequency receiver 34 may be disabled if it is determined that the fob 14 is located in the cabin of the vehicle 12. In other embodiments, the fob 14 may be reconfigured so that is does not respond to the polling signals. In still other embodiments, the fob 14 may be reconfigured so that it does not recognize the polling signals. Other configurations and arrangements are, of course, also possible.

Figure 2:
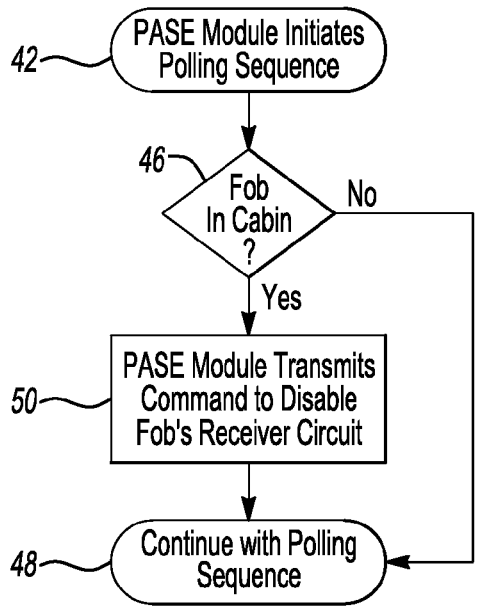
FIG. 2 is flow chart depicting an embodiment of a strategy for controlling the passive entry system of FIG. 1.

Referring now to FIGS. 1 and 2, the PASE module 10 initiates the polling process when, for example, the engine system 28 is off as indicated at 42. As indicated at 46, the PASE module 10 determines if the fob 14 is located in the cabin of the vehicle 12. For example, the micro-controller 16 may determine that the RSSI values associated with the response signal from the fob 14 detected by the antennas 22, 24 are approximately equal. If no, the PASE module 10 continues with the polling sequence as indicated at 48. If yes, the micro-controller 16 transmits a command to the fob 14 to prompt the fob 14 to disable the low frequency receiver 34 as indicated at 50. The strategy then proceeds to 48.

In the embodiment of FIG. 2, the low frequency receiver 34 may be re-enabled if, for example, a button (not shown) on the fob 14 is pressed or the battery 37 is replaced.

Returning again to FIG. 1, the fob 14 may, as introduced above, recognize the polling signals broadcast by the PASE module 10. For example, the fob 14 may store one or more identifiers that are compared with a corresponding identifier embedded in the received polling signals. If the identifiers embedded in the polling signals match one of the stored identifiers, the fob 14 may recognize the polling signals.

In some embodiments, the fob 14 may store a global identifier and a local identifier. The global identifier may be common to some or all fobs produced by a manufacturer of such fobs and may be used, for example, to test a batch of fobs produced by the manufacturer. Other uses, however, are also possible. The local identifier may be specific to a certain vehicle and may be broadcast, for example, via the polling signals. As such, fobs for different vehicles may have the same global identifier but different local identifiers.

The fob 14 illustrated in FIG. 1 may store the local identifier in memory (not shown) associated with the low frequency receiver 34 ("receiver memory") and memory (not shown) associated with the micro-controller 32 ("micro-controller memory"). The fob 14 may store the global identifier in the micro-controller memory. During an example recognition process, the fob 14 may compare the identifier embedded in the received polling signals against the copy of the local identifier stored in the receiver memory and the copy of the global identifier stored in the micro-controller memory. If the received identifiers match any of the aforementioned stored identifiers, the fob 14 recognizes the polling signals and powers-up in anticipation of further communication, e.g., transmission of a response signal, data processing, etc. If the received identifiers do not match the stored identifiers, the fob 14 does not recognize the polling signals. As apparent to those of ordinary skill, a greater amount of power from the battery 37 is consumed if the fob 14 recognizes the polling signals because the fob 14 powers-up if it recognizes the polling signals.

Figure 3:
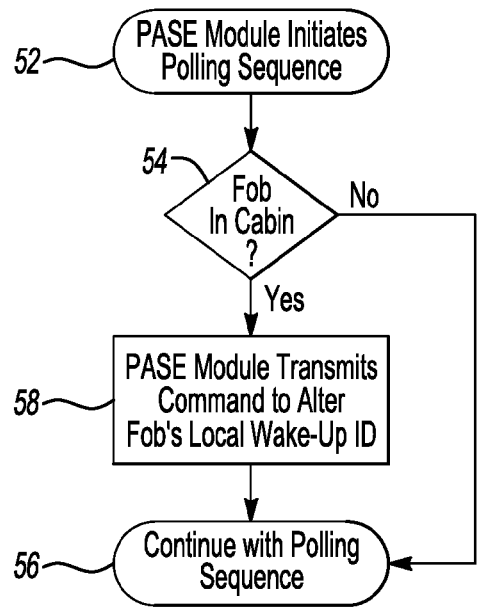
FIG. 3 is a flow chart depicting another embodiment of a strategy for controlling the passive entry system of FIG. 1.

Referring now to FIGS. 1 and 3, the PASE module 10 initiates a polling sequence including information indicative of the local identifier as indicated at 52. As indicated at 54, the PASE module 10 determines if the fob 14 is located in the cabin of the vehicle 12. If no, the PASE module 10 continues with the polling sequence as indicated at 56. If yes, the PASE module 10 transmits a command to the fob 14 to prompt the fob 14 to alter its local identifier stored in the receiver memory as indicated at 58. For example, the command may prompt the micro-controller 32 to clear that portion of receiver memory storing the local identifier. The command may also prompt the micro-controller 32 to increment, decrement or otherwise alter that portion of receiver memory. The strategy then proceeds to 56. The fob 14 will no longer recognize the polling sequence (and power-up) because the received local identifier will not match the altered local identifier.

In the embodiment of FIG. 3, the PASE module 10 may transmit another command to prompt the fob 14 to copy the local identifier from the micro-controller memory into the receiver memory thus allowing the fob 14 to recognize received local identifiers. For example, as a result of a button press on the fob 14, vehicle activity and/or the battery 37 being replaced (an example of a power on reset event), the PASE module 10 may poll the fob 14 with the global identifier to prompt the fob 14 to power-up. The PASE module 10 may then transmit the command described above.

Figure 4:
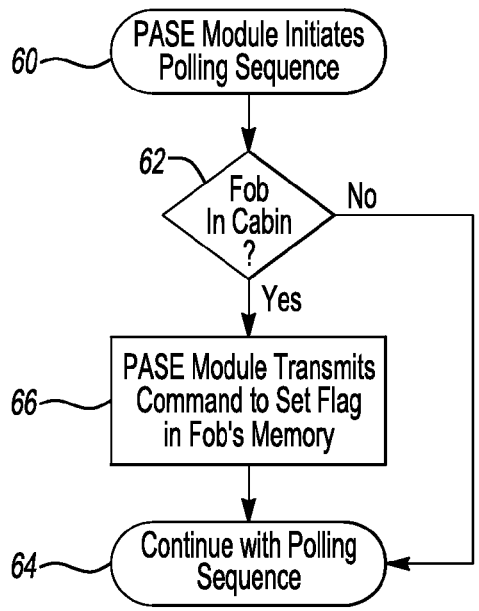
FIG. 4 is a flow chart depicting yet another embodiment of a strategy for controlling the passive entry system of FIG. 1.

Referring now to FIGS. 1 and 4, the PASE module 10 initiates a polling sequence as indicated at 60. As indicated at 62, the PASE module 10 determines if the fob 14 is located in the cabin of the vehicle 12. If no, the PASE module 10 continues with the polling sequence as indicated at 64. If yes, the PASE module 10 transmits a command to the fob 14 to prompt the fob 14 to set, for example, a flag within memory (not shown) of the fob 14 that will inhibit it from responding to the polling signals but not other signals as indicated at 66. This flag, for example, may disable the high frequency transmitter 36, may prevent the micro-controller 32 from generating data indicative of a response signal, etc. The strategy then proceeds to 64. As such, the fob 14 will wake-up for each poll message transmitted by the PASE module 10 and process data associated with each message but will then return to sleep because the flag is set. As apparent to those of ordinary skill, the fob 14 will no longer consume power from the battery 37 to transmit a response to the poll messages.

The PASE module 10 may transmit another command to prompt the fob 14 to clear the flag as a result of a button press on the fob 14, vehicle activity and/or the battery 37 being replaced.

Returning to FIG. 1, the fob 14 may be pre-programmed to reconfigure itself without the receipt of PASE module 10 initiated commands, such as those indicated at 50, 58, 66 with reference to FIGS. 2, 3 and 4 respectively. In some embodiments, the fob 14, e.g., the micro-controller 32, may disable the low frequency receiver 34 after receiving a predetermined number of polling signals within a predetermined period of time. For example, the micro-controller 32 may increment a counter each time a polling signal is received and may disable the low frequency receiver 34 after receiving four recognized polling signals within five seconds. In other embodiments, the micro-controller 32 may clear or otherwise alter that portion of receiver memory storing the local identifier after receiving a predetermined number of polling signals within a predetermined period of time. In still other embodiments, the fob 14 may set the flag within its memory that will inhibit it from responding to the polling signals but not other signals. The fob 14 may then be returned to its initial state via the techniques described above. For example, a button press and/or power on reset event of the fob 14 may cause the micro-controller 32 to return the fob 14 to its initial state. Similarly, vehicle activity communicated to the fob 14 may cause the micro-controller 32 to return the fob 14 to its initial state, etc. Other configurations and arrangements are also possible.

The above techniques may also be implemented at vehicle assembly and/or during vehicle transport/storage to, for example, conserve power of the battery 37.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A passive entry system for an automotive vehicle having a cabin comprising:
   a control unit configured to broadcast a plurality of wake-up signals to prompt a token to power-up if the token is in a low-power consumption mode; and
   a token configured to recognize at least one of the plurality of wake-up signals and to generate a response signal for the control unit in response to recognizing the at least one of the plurality of wake-up signals, the control unit further configured to determine if the token is located in the cabin based on the response signal and to broadcast a reconfiguration signal to prompt the token to reconfigure so that the token does not recognize wake-up signals broadcast subsequent to the reconfiguration signal if the token is located in the cabin.

2. The system of claim 1 wherein each of the plurality of wake-up signals includes information indicative of a control unit identifier and wherein the token is further configured to compare at least one of the control unit identifiers with a stored identifier.

3. The system of claim 2 wherein the token includes a receiver and wherein the stored identifier is stored within a memory of the receiver.

4. The system of claim 2 wherein the token recognizes at least one of the plurality of wake-up signals if the at least one control unit identifier matches the stored identifier.

5. The system of claim 2 wherein the token is further configured to alter the stored identifier in response to receiving the reconfiguration signal.

6. The system of claim 5 wherein the token is further configured to restore the stored identifier in response to receiving another reconfiguration signal.

7. The system of claim 5 wherein the token is further configured to restore the stored identifier in response to at least one of a button press and a power on reset event.

8. A passive entry system for an automotive vehicle having a cabin comprising:
   a control unit configured to broadcast a plurality of signals; and
   a token configured to generate a response signal for the control unit based on one of the plurality of signals, the control unit further configured to determine if the token is located in the cabin based on the response signal and to broadcast a reconfiguration signal to prompt the token to reconfigure so that the token does not generate the response signal to at least some signals broadcast by the control unit subsequent to the reconfiguration signal.

9. The system of claim 8 wherein the token includes a receiver and is further configured to deactivate the receiver in response to receiving the reconfiguration signal.

10. The system of claim 8 wherein at least one of the plurality of signals includes information indicative of a control unit identifier and wherein the token includes a stored identifier and is further configured to recognize the at least one of the plurality of signals if the control unit identifier matches the stored identifier.

11. The system of claim 10 wherein the token is further configured to alter the stored identifier in response to receiving the reconfiguration signal.

12. The system of claim 11 wherein the token is further configured to restore the stored identifier in response to receiving another reconfiguration signal.

13. The system of claim 11 wherein the token is further configured to restore the stored identifier in response to at least one of a button press and a power on reset event.

14. The system of claim 8 wherein the token includes a transmitter and is further configured to inhibit broadcasting response signals via the transmitter in response to receiving the reconfiguration signal.

15. The system of claim 8 wherein the token comprises a key fob.

16. A passive entry system for an automotive vehicle comprising:
a token configured to (i) determine if a predetermined number of wireless signals has been received, (ii) generate a response signal to at least one of the plurality of wireless signals if the number of received wireless signals is less than the predetermined number of wireless signals, and (iii) reconfigure so that the token does not provide a response to at least one of the plurality of wireless signals if the number of received wireless signals is greater than the predetermined number of wireless signals.

17. The system of claim 16 wherein the token includes a receiver and wherein the token disables the receiver if the number of received wireless signals is greater than the predetermined number of wireless signals.

18. The system of claim 16 wherein the token includes a transmitter to transmit the response signal and wherein the token is further configured to disable the transmitter if the number of received wireless signals is greater than the predetermined number of wireless signals.

19. The system of claim 18 wherein the token is further configured to re-enable the transmitter in response to at least one of a button press and a power on reset event.

20. The system of claim 16 wherein the token is further configured to recognize at least one of the plurality of wireless signals if a received identifier matches a stored identifier and to alter the stored identifier during reconfiguration.

* * * * *